United States Patent
Miyanoo et al.

(10) Patent No.: US 7,152,560 B2
(45) Date of Patent: Dec. 26, 2006

(54) ENGINE VALVE PERFORMANCE CONTROLLER

(75) Inventors: Yuji Miyanoo, Seto (JP); Fumito Takimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/186,776

(22) Filed: Jul. 22, 2005

(65) Prior Publication Data

US 2006/0016407 A1      Jan. 26, 2006

(30) Foreign Application Priority Data

Jul. 26, 2004   (JP)   .............................. 2004-217613

(51) Int. Cl.
*F01L 1/34* (2006.01)
(52) U.S. Cl. .............................. 123/90.15; 123/90.17; 123/406.29
(58) Field of Classification Search ............. 123/90.15, 123/90.16, 90.17, 90.18, 406.11, 406.12, 123/406.16, 406.21, 406.29, 406.45, 435
See application file for complete search history.

(56) References Cited

U.S. PATENT DOCUMENTS 5,235,952 A  *  8/1993  Takasuka et al. ........ 123/406.3
6,425,357 B1 *  7/2002  Shimizu et al. ......... 123/90.16

FOREIGN PATENT DOCUMENTS

JP       2001-263015       9/2001

* cited by examiner

*Primary Examiner*—Ching Chang
(74) *Attorney, Agent, or Firm*—Kenyon & Kenyon LLP

(57) ABSTRACT

A valve performance controller for use in an engine that performs ignition timing retardation control to prevent knocking. The controller variably controls valve performance of an intake valve in accordance with an operation state of the engine. The controller corrects a control target so that the compression end temperature of a combustion chamber decreases when a retardation amount of the ignition timing obtained through the retardation control is greater than a predetermined value. The correction is performed only when the engine performance degradation that would occur when the ignition timing is retarded in a state in which the control target is uncorrected is predicted to be greater than the engine performance degradation that would occur when the control target is corrected.

10 Claims, 5 Drawing Sheets

ENGINE VALVE PERFORMANCE CONTROLLER

BACKGROUND OF THE INVENTION

The present invention relates to an engine valve performance controller, and more particularly, to an improvement in control for preventing knocking.

In recent years, various technologies have been put into practice to improve engine performance. The valve performance of engine valves (intake and exhaust valves) characteristics such as valve timing or valve lift are varied to reduce trade-off under different operational conditions (for example, refer to Japanese Patent Laid-Open Publication No. 2001-263015).

Under severe operational conditions involving high temperatures and high loads, the compression end temperature within a combustion chamber becomes high. In such a state, knocking has a tendency to occur. In such a case, the ignition timing is normally retarded to decrease the combustion speed and thus prevent knocking.

However, if the combustion speed is decreased by retarding the ignition timing, the exhaust gas temperature will rise. Therefore, if the ignition timing is significantly retarded, the fuel injection amount must be increased to prevent the temperature of an exhaust gas purifying catalyst from becoming excessively high. Accordingly, when knocking is prevented just by retarding the ignition timing, this would lower fuel efficiency due to the increase of the fuel injection amount.

Accordingly, it is an object of the invention to provide an engine valve performance controller that efficiently prevents knocking.

SUMMARY OF THE INVENTION

One aspect of the present invention is an engine valve performance controller for use in controlling valve performance of an intake valve in an engine that performs ignition timing retardation control to prevent knocking in at least one combustion chamber. The engine valve performance controller includes an ECU having program logic, which when executed and an ignition timing retardation amount, required by the retardation control to achieve a valve performance control target for the intake valve that is in accordance with a present operation state of the engine, is greater than a predetermined value, the program logic corrects the control target to decrease compression end temperature in the combustion chamber, in which the ECU thereby variably controls valve performance of the intake valve in accordance with the operation state of the engine.

In the structure described above, during operation of the engine, ignition timing retardation control is performed to prevent knocking. Further, the valve performance of the intake valve, such as operational angle or maximum lift amount, is variably controlled in accordance with the operation state of the engine. An ignition timing retardation amount, which is obtained through retardation control when a valve performance control target is set in accordance with the present operation state, is compared with a predetermined value. If the ignition timing retardation amount is greater than the predetermined value, the control target is corrected by a correction means so as to decrease the compression end temperature in the combustion chamber. The correction decreases the compression end temperature in the combustion chamber and enables the required retardation amount of the ignition timing necessary to prevent knocking to be reduced. In a normal engine, the fuel injection amount would be greatly increased to prevent excessive temperature increase in an exhaust gas purifying catalyst when the ignition timing is greatly retarded to prevent knocking. However, the invention of claim 1 minimizes the increase in the fuel injection amount and prevents the fuel efficiency from being lowered. In this manner, the present invention prevents knocking more efficiently than when knocking is prevented only by retarding the ignition timing.

Other aspects and advantages of the present invention will become apparent from the following description, taken in conjunction with the accompanying drawings, illustrating by way of example the principles of the invention.

BRIEF DESCRIPTION OF THE SEVERAL VIEWS OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
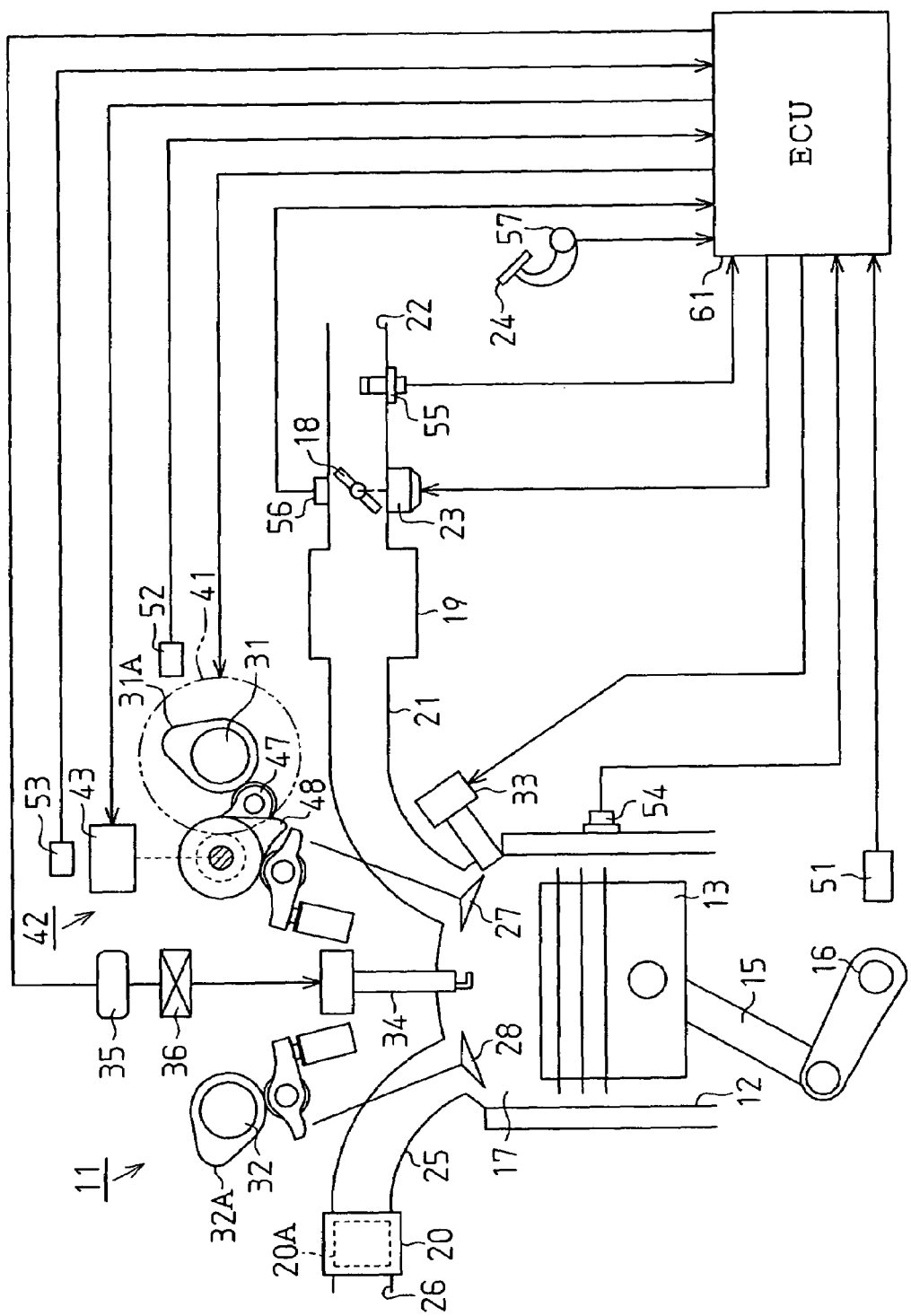
FIG. 1 is a schematic diagram showing the structure of a valve performance controller according to an embodiment of the present invention.

An embodiment of the present invention will now be described with reference to the drawings. As shown in FIG. 1, an in-cylinder injection gasoline engine, which functions as an internal combustion engine (referred hereafter as the "engine") 11. The engine 11 has a plurality of cylinders 12. A piston 13 reciprocates in each cylinder 12. Each piston 13 is connected to a crankshaft 16, which functions as an output shaft of the engine 11, by a connecting rod 15. The connecting rod 15 converts the reciprocating motion of each piston 13 to rotational motion, which is then transmitted to the crankshaft 16.

Each of the cylinders 12 has a combustion chamber 17, which is connected to an intake passage 22 including a throttle valve 18, a surge tank 19, and an intake manifold 21. The ambient air of the engine 11 is drawn into the combustion chambers 17 after sequentially passing by the throttle valve 18, the surge tank 19, and the intake manifold 21 in the intake passage 22. The throttle valve 18, which is rotatable and arranged in the intake passage 22, is driven by an actuator 23, which is an electric motor or the like. The actuator 23 is activated in accordance with the depression of an accelerator pedal 24 to rotate the throttle valve 18. The amount of air flowing through the intake passage 22 (intake air amount) varies in accordance with the rotation angle of the throttle valve 18 (throttle angle).

Each combustion chamber 17 is also connected to an exhaust passage 26, which includes an exhaust manifold 25 and a catalytic converter 20 containing an exhaust gas purifying catalyst 20A. Combustion gas produced in the combustion chamber 17 is discharged out of the engine 11 after sequentially passing through the exhaust manifold 25 and the catalytic converter 20 in the exhaust passage 26.

In the engine 11, each cylinder 12 is provided with an intake valve 27 and an exhaust valve 28. The intake valve 27 selectively opens and closes the portion connecting the intake passage 22 and the combustion chamber 17. The exhaust valve 28 selectively opens and closes the portion connecting the exhaust passage 26 and the combustion chamber 17. Valve springs (not shown) urge the intake and exhaust valves 27 and 28 in the direction disconnecting the combustion chamber 17 and the intake and exhaust passages 22 and 26 (i.e., in the valve closing direction, which is the upward direction as viewed in FIG. 1). An intake camshaft 31 having an intake cam 31A is located above the intake valve 27. An exhaust camshaft 32 having an exhaust cam 32A is located above the exhaust valve 28. The rotation of the crankshaft 16 is transmitted to the intake and exhaust camshafts 31 and 32 to rotate the intake and exhaust camshafts 31 and 32. When rotated, the intake and exhaust camshafts 31 and 32 respectively force the intake and exhaust valves 27 and 28 downward against the force of the valve springs. The downward movement of the intake and exhaust valves 27 and 28 respectively connect the intake and exhaust passages 22 and 26 to the combustion chamber 17 (open valve state). In this manner, the rotation of the intake and exhaust camshafts 31 and 32 opens and closes the intake and exhaust valves 27 and 28, respectively.

In the engine 11, each cylinder 12 is provided with an electromagnetic fuel injection valve 33. The opening and closing of each fuel injection valve 33 are controlled to directly inject high-pressure fuel into the associated combustion chamber 17. The fuel injected by the fuel injection valve 33 is mixed with air in the combustion chamber 17 to form an air-fuel mixture.

An ignition plug 34 is arranged in each cylinder 12 of the engine 11. Each ignition plug 34 is activated by an ignition signal from an igniter 35. High voltage, which is output by an ignition coil 36, is applied to the ignition plug 34. As a result, the ignition plug 34 generates a spark discharge that ignites and burns the air-fuel mixture. This produces high-temperature, high-pressure combustion gas that reciprocates the piston 13 and rotates the crankshaft 16 and generates the drive power (output torque) of the engine 11.

In the engine 11, each piston 13 is reciprocated twice and the crankshaft 16 is rotated twice within a period from when air is drawn into the corresponding combustion chamber 17 to when combustion gas is discharged from the combustion chamber 17. This period of time corresponds to one cycle. As is well known, one cycle includes four strokes, which are the intake stroke, compression stroke, power stroke, and exhaust stroke. In the intake stroke, the piston 13 moves downward to generate negative pressure (pressure that is lower than atmospheric pressure) in the combustion chamber. Air is drawn into the combustion chamber 17 by the negative pressure. In the compression stroke, the piston 13 moves upward to compress the air-fuel mixture formed by the air and the fuel injected from the fuel injection valve 33. In the power stroke, the piston 13 is forced downward by the pressure generated by the ignition and combustion of the compressed air-fuel mixture. In the exhaust stroke, the piston 13, which has been forced downward, moves upward again to discharge the combustion gas out of the combustion chamber 17.

The engine 11 is provided with a variable valve timing mechanism 41 and a variable operational angle mechanism 42, which function together as a variable valve performance mechanism that varies the valve performances of the intake valve 27.

Figure 2:
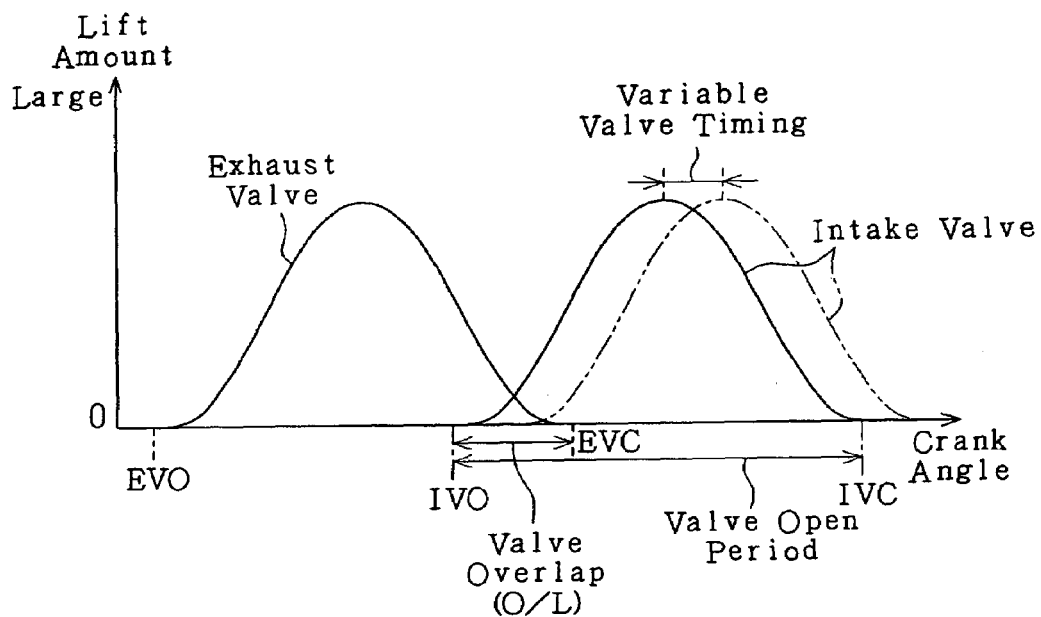
FIG. 2 is a performance diagram showing the valve timing of an intake valve varied by a variable valve timing mechanism.

The variable valve timing mechanism 41 continuously varies the valve timing of the intake valve 27 with respect to the crank angle (the rotational angle of the crankshaft 16) by changing the rotation phase of the intake camshaft 31 relative to the crankshaft 16. The variable valve timing mechanism 41 is driven by, for example, hydraulic pressure. The valve timing of the intake valve 27 may be represented, for example, by a valve opening timing IVO and a valve closing timing IVC as shown in FIG. 2. The valve timing is advanced or retarded in a state in which the valve open period of the intake valve 27 (the period from the valve opening timing IVO to the valve closing timing IVC) remains fixed. FIG. 2 shows the valve opening timing EVO and the valve closing timing EVC of the exhaust valve 28.

Referring to FIG. 2, when the valve timing is varied as shown by the broken, the time period during which both the intake valve 27 and the exhaust valve 28 are open, that is, the overlap in the valve open periods of the valves 27 and 28 (the time period from the valve opening timing IVO of the intake valve 27 to the valve closing timing EVC of the exhaust valve 28, hereafter referred to as the valve overlap O/L) is varied. Assuming that the valve timing of the exhaust valve 28 is fixed, the valve overlap O/L, which is minimum when the valve timing retardation of the intake valve 27 is maximum, increases as the valve timing of the intake valve 27 advances.

Figure 3:
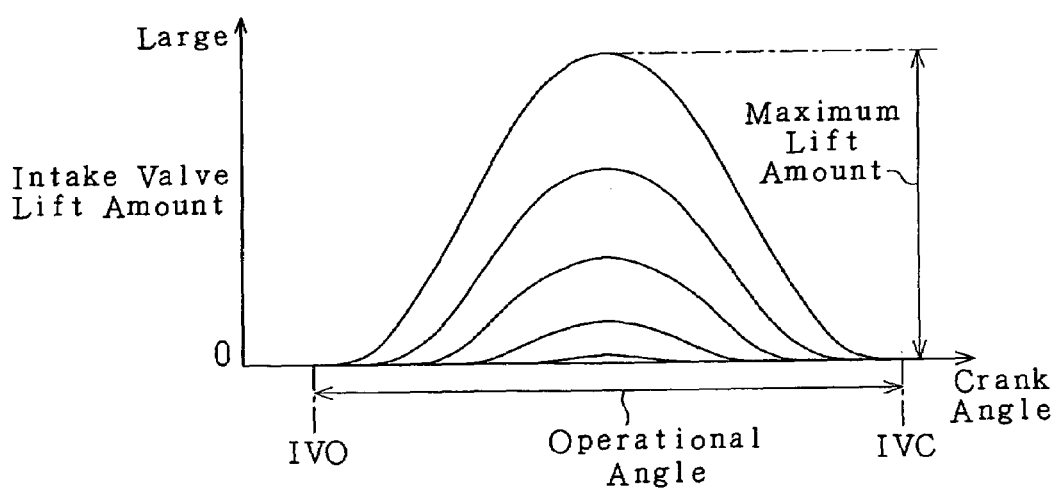
FIG. 3 is a performance diagram showing the operational angle of an intake valve varied by a variable operational angle mechanism.

The variable operational angle mechanism 42 continuously varies the operational angle of the intake valve 27. The variable operational angle mechanism 42 is driven by an actuator 43, such as an electric motor. Referring to FIG. 3, the term "operational angle" as used herein is the angular rotation range of the intake cam 31A (represented by the crank angle in FIG. 3) from the valve opening timing IVO to the valve closing timing IVC of the intake valve 27. In the present embodiment, the variable operational angle mechanism 42 also continuously varies the maximum lift amount of the intake valve 27. The maximum lift amount is the amount of movement of the intake valve 27 when the intake valve 27 is moved (lifted) to the lowermost position. The variable operational angle mechanism 42 synchronously varies the operational angle and the maximum lift amount. For example, a decrease in the operational angle decreases the maximum lift amount. As the operational angle decreases, the valve opening timing IVO and the valve closing timing IVC of the intake valve 27 become closer to each other and shorten the valve open period. This decreases the amount of intake air in each cylinder 12.

As shown in FIG. 1, the vehicle further includes various sensors for detecting the conditions of various parts. These sensors include, for example, a crank angle sensor 51, a cam angle sensor 52, a rotational angle sensor 53, a knock sensor 54, an air flow meter 55, a throttle sensor 56, and an acceleration sensor 57.

The crank angle sensor 51 generates a pulse signal whenever the crankshaft 16 rotates a certain angle. The signal is used to calculate the crank angle, which is the rotational angle of the crankshaft 16. The signal is also used to calculate the engine speed, which is the rotation of the crankshaft 16 per unit time. The cam angle sensor 52 is arranged in the vicinity of the intake camshaft 31 to detect the rotational angle (cam angle) of the camshaft 31.

The rotational angle sensor 53 detects the rotational angle of the actuator 43 to determine the valve performance (operational angle and maximum lift amount) of the intake valve 27.

The knock sensor 54 detects vibration transmitted from the combustion chamber 17 to the cylinder block or the like. The detection result of the knock sensor 54 is used to determine whether or not knocking has occurred. The term "knocking" refers to pressure vibrations produced in the combustion chamber 17 by ignition of non-combusted gas in the cylinders 12. Knocking may overheat or melt the pistons 13 and electrodes of the ignition plugs 34. Knocking is particularly apt to occur under severe operational conditions, such as when the temperature and load are high and thus increase the compression end temperature and the compression end pressure (in-cylinder temperature and pressure at the compression top dead center TDC).

The air flow meter 55 detects the amount of air flowing through the intake passage 22 (intake air amount). The throttle sensor 56 detects the throttle angle. The acceleration sensor 57 determines the amount the accelerator pedal 24 is depressed by the driver.

The vehicle is further provided with an electronic control unit (ECU) 61, which controls the engine 11 and other parts based on the signals described above. The electronic control unit 61, which is principally formed by a microcomputer, includes a central processing unit (CPU). The CPU performs computation based on control program logic, initial data, control maps, and the like, which are stored in a read only memory (ROM), to execute various control operations based on the computation results. The computation results of the CPU are temporarily stored in a random access memory (RAM).

The electronic control unit 61 executes various control operations such as ignition timing control and fuel injection control for the engine 11 or control of the valve performance of the intake valve 27 (valve timing control and operational angle control).

The ignition timing control determines a basic ignition timing and a required retardation amount of the ignition timing. Then, the required retardation amount is subtracted from the basic ignition timing to determine the final ignition timing.

The basic ignition timing is the ignition timing that maximizes the engine output without taking into consideration the effects of knocking. The basic ignition timing is determined based on the present operation state of the engine 11.

The required retardation amount is determined based on the maximum retardation amount, learned knocking amount, and a knocking control amount. The maximum retardation amount is a correction amount for correcting the basic ignition timing to a retarded timing at which the prevention of knocking is ensured and is calculated based on the operation state of the engine 11. The learned knocking amount is used to correct and advance the basic ignition timing that has been retarded by the maximum retardation amount in accordance with the occurrence of knocking. If knocking tends to frequently occur, the learned knocking amount is gradually decreased. If the knocking does not frequently occur, the learned knocking amount is gradually increased. The knocking control amount is used to correct and retard the ignition timing in accordance with how frequent knocking is presently occurring. When knocking is not occurring, the knocking control amount is reduced by a predetermined amount. When knocking is occurring, the knocking control amount is increased by a predetermined amount.

When the crank angle obtained from the signal from the crank angle sensor 51 corresponds to the final ignition timing, an ignition signal is provided to the igniter 35. In response to the ignition signal, the igniter 35 interrupts the flow of primary current in the ignition coil 36. The interruption generates high voltage in a secondary coil of the ignition coil 36 and ignites the ignition plug 34. As a result, the ignition plug 34 generates a spark discharge that ignites and burns the air-fuel mixture.

The fuel injection control determines the amount of fuel that must be injected for the air-fuel ratio of the air-fuel mixture to become equal to a predetermined value based on the operation state of the engine 11, such as the engine speed and engine load. The calculated fuel amount is referred to as the basic injection amount (basic injection time). The engine load is obtained, for example, based on the intake air amount of the engine 11 or other related parameters (e.g., the throttle angle or accelerator depression amount). The basic injection amount is corrected based on sensor signals to set the air-fuel ratio to a value corresponding to the operation state of the engine 11. The fuel injection valve 33 is activated for a period of time corresponding to the corrected injection amount. When activated, the fuel injection valve 33 opens to inject the corrected amount of fuel.

If the ignition timing control significantly retards the final ignition timing to prevent knocking, the combustion speed is apt to decrease and increase the exhaust gas temperature. Such significant retardation of the ignition timing may excessively increase the temperature of the exhaust gas purifying catalyst 20A in the catalytic converter 20. Therefore, in the fuel injection control of the present invention, if the ignition timing control significantly retards the final ignition timing, the fuel injection amount is corrected and increased in accordance with the retardation amount of the ignition timing in order to prevent the temperature of the exhaust gas purifying catalyst 20A from excessively increasing.

The valve timing control for the intake valves 27 determines a target valve timing based on the operation state of the engine 11, such as engine speed and engine load. The target valve timing is a target for controlling the valve timing of the intake valve 27. The variable valve timing mechanism 41 is controlled so that the actual valve timing of the intake valve 27, which is determined from the detection results of the crank angle sensor 51 and the cam angle sensor 52, becomes the same as the target valve timing. This controls and adjusts the valve timing of the intake valve 27 to an appropriate timing that is in accordance with the operation state of the engine 11.

The operational angle control of the intake valve 27 calculates a target operational angle based on parameters related to the operation state of the engine 11, such as the engine speed and engine load. The target operational angle is a target for controlling the operational angle of the intake valve 27. Further, based on the rotational angle detected by the rotational angle sensor 53, the actual operational angle of the intake valve 27 corresponding to the detected rotational angle is calculated. Activation of the actuator 43 is controlled such that the actual operational angle becomes the same as the target operational angle. This adjusts the operational angle (maximum lift amount) of each intake valve 27 to an appropriate value that is in accordance with the operation state of the engine 11.

For example, the operational angle of each intake valve 27 is increased to ensure the necessary intake air for the engine 11 as the engine load increases when the engine speed is constant. This is because, a greater engine output is required as the engine load increases, and a greater amount of intake air is required to generate such greater output.

A smaller amount of intake air is required as the engine load decreases. Therefore, the operational angle of each intake valve 27 is decreased to reduce the intake air amount. This eliminates the need to close the throttle valve 18 so as to reduce the intake air amount and enables the throttle valve 18 to be kept open at a predetermined angle. This prevents deficiencies that would occur when closing the throttle valve 18, such as an increase in pumping loss and a decrease in fuel efficiency.

The valve timing control and the operational angle control are performed to vary the valve opening timing IVO and the valve closing timing IVC independently from each other. For example, the valve opening timing IVO (or the valve closing timing IVC) may be advanced or retarded in a state in which the valve closing timing IVC (or the valve opening timing IVO) is constant. Further, the valve opening timing IVO and the valve closing timing IVC may be advanced or retarded independently from each other.

When knocking occurs, the ignition timing control retards the ignition timing from the timing originally required to generate the maximum output. The retardation correction prevents knocking. However, the retardation correction lowers the engine output as compared to when the ignition timing is controlled to match its originally required value. Additionally, as described above, the fuel injection amount is increased to prevent excessive temperature increase of the exhaust gas purifying catalyst 20A that would be caused by retardation. This would increase the fuel injection amount and decrease the fuel efficiency. However, the valve performance may be varied to change the compression end temperature and the compression end pressure, which are closely related with knocking (described in more detail below). Therefore, in the present embodiment, in addition to retarding the ignition timing, the valve performance is varied. This eliminates the above problem and prevents knocking more efficiently.

Figure 4:
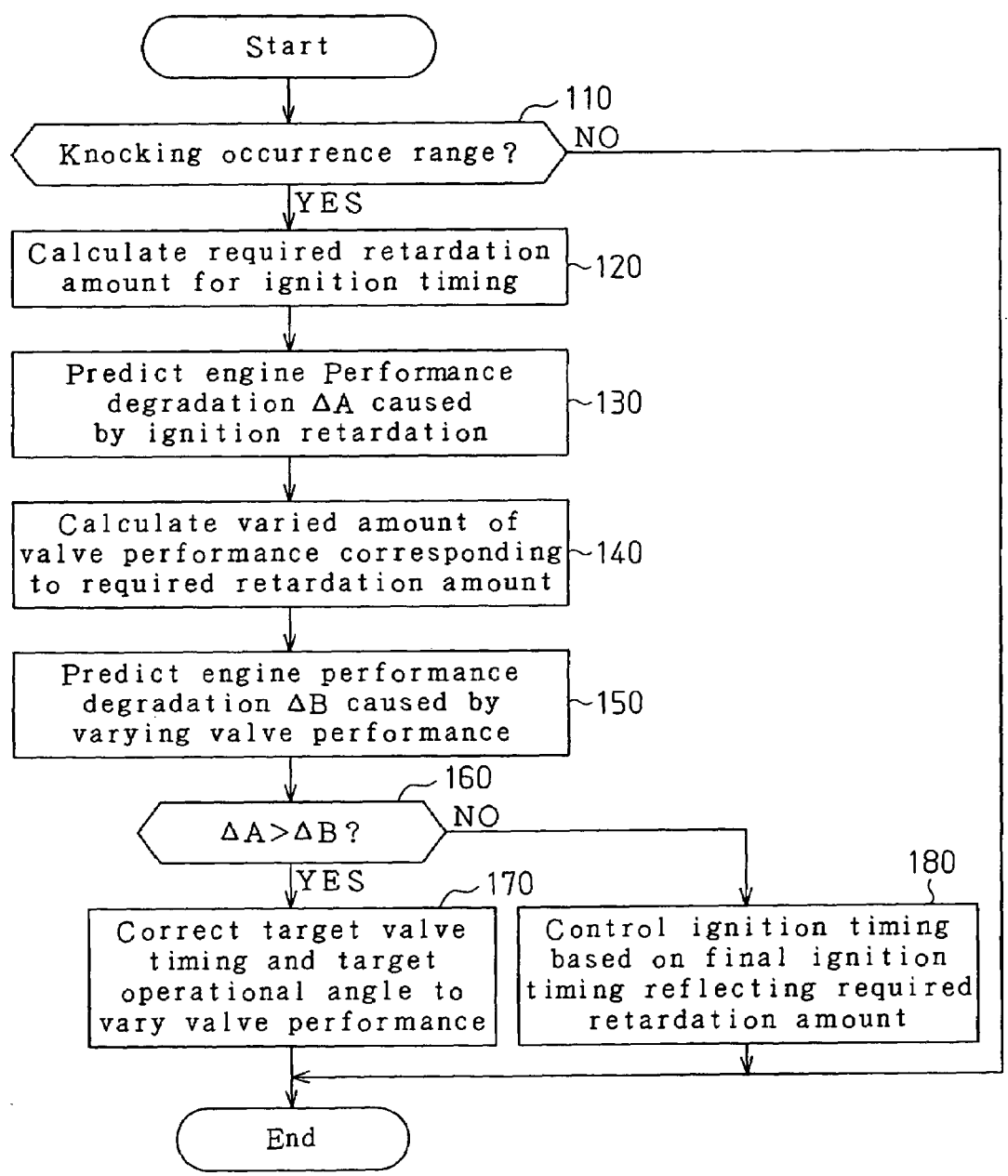
FIG. 4 is a flowchart showing a knocking prevention process.

The knocking prevention process executed by the electronic control unit 61 will now be described with reference to the flowchart of FIG. 4.

When the routine is started, the electronic control unit 61 determines, in step 110, whether the present operation state of the engine 11 is in a knocking occurrence range. Prior to the determination, the range of the engine speed and the engine load that represent the engine operation state in which knocking is likely to occur (e.g., high load and high engine speed range) is specified as the knocking occurrence range. Then, the electronic control unit 61 determines whether the present engine speed and the engine load are in the knocking occurrence range. If the determination is affirmative, the electronic control unit 61 proceeds to step 120. If the determination is negative, the knocking suppressing control routine is terminated.

In step 120, a required retardation amount for the ignition timing is calculated. This required retardation amount may be the required retardation amount used for calculating the final ignition timing during the ignition timing control described above. The required retardation amount corresponds to the retardation amount of the ignition timing required to prevent knocking when the control target of the valve performance of each intake valve 27 is set in accordance with the present engine operation state. As described above, knocking is more apt to occur when the compression end temperature or the compression end pressure increases. The compression end temperature and the compression end pressure are closely related to the ignition timing. In general, retardation of the ignition timing tends to decrease the compression end temperature and the compression end pressure and accordingly prevents knocking. Thus, the required retardation amount is the retardation amount of the ignition timing required to decrease the current compression end temperature and the current compression end pressure to levels at which knocking will not occur.

In step 130, engine performance degradation ΔA that would occur when the current final ignition timing is retarded by the required retardation amount obtained in step 120 is predicted. The degradation ΔA is at least either the decrease in fuel efficiency or the decrease in engine output. The magnitude of degradation ΔA may be predicted, for example, in the following manner. The engine performance A1 when ignition is performed at the present final ignition, which is not retarded and corrected, is obtained. Further, the engine performance A2 when ignition is performed at a the final ignition timing that is retarded by using the required retardation amount is obtained. The difference between the engine performance A1 and the engine performance A2 is then obtained as the engine performance degradation ΔA. The engine performance degradation may also be obtained by determining in advance the relationship between the required retardation amount and the engine performance degradation for various engine operation states through experiments or the like. The engine performance degradation is obtained based on the relationship corresponding to the current operation state of the engine 11 and the required retardation amount.

Subsequently, in step 140, the varied amount of the valve performance that corresponds to the required retardation amount obtained in step 120 is calculated. As described before, the knocking control is a technique for preventing knocking by retarding the ignition timing to decrease the compression end temperature and the compression end pressure. However, the same effect (decrease of the compression end temperature and the compression end pressure) may be obtained by changing the valve opening timing IVO or the valve closing timing IVC of the intake valve 27.

Figure 5:
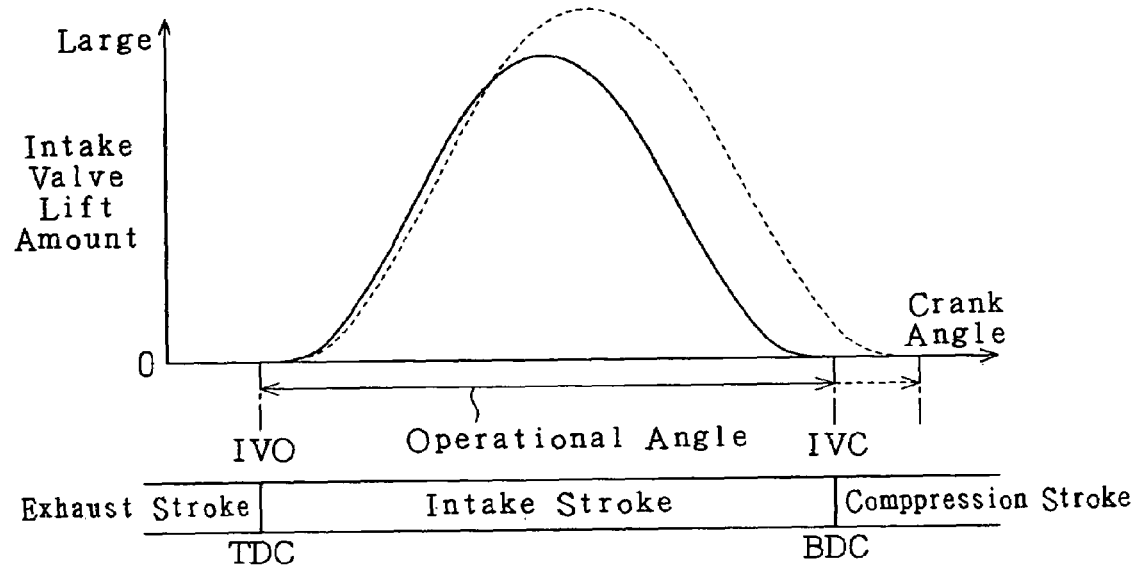
FIG. 5 is a performance diagram showing the relationship between the crank angles and the valve performance of the intake valve when the valve performance control targets are corrected to decrease the compression end temperature.
Figure 6:
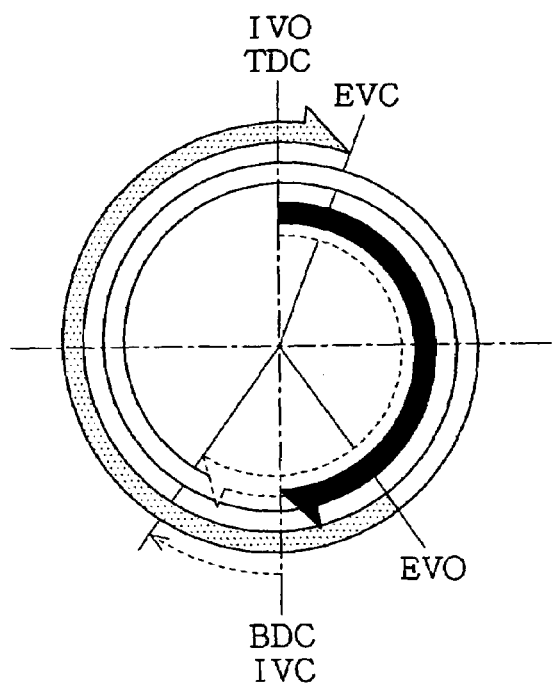
FIG. 6 is a diagram showing a valve open period of the intake valve in FIG. 5.

For example, as shown by the broken lines in FIGS. 5 and 6, if the valve closing timing IVC of the intake valve 27 is later than the intake bottom dead center BDC, the compression end pressure would be lower than when the valve closing timing IVC is close to the intake bottom dead center BDC (as shown in the state indicated by the solid line in FIG. 5 and the thick line in FIG. 6). This is because the amount of air compressed during the compression stroke, which follows the intake stroke, is smaller and the period of time during which the piston 13 moves upward is shorter when the valve closing timing IVC is later than the intake bottom dead center BDC.

Figure 7:
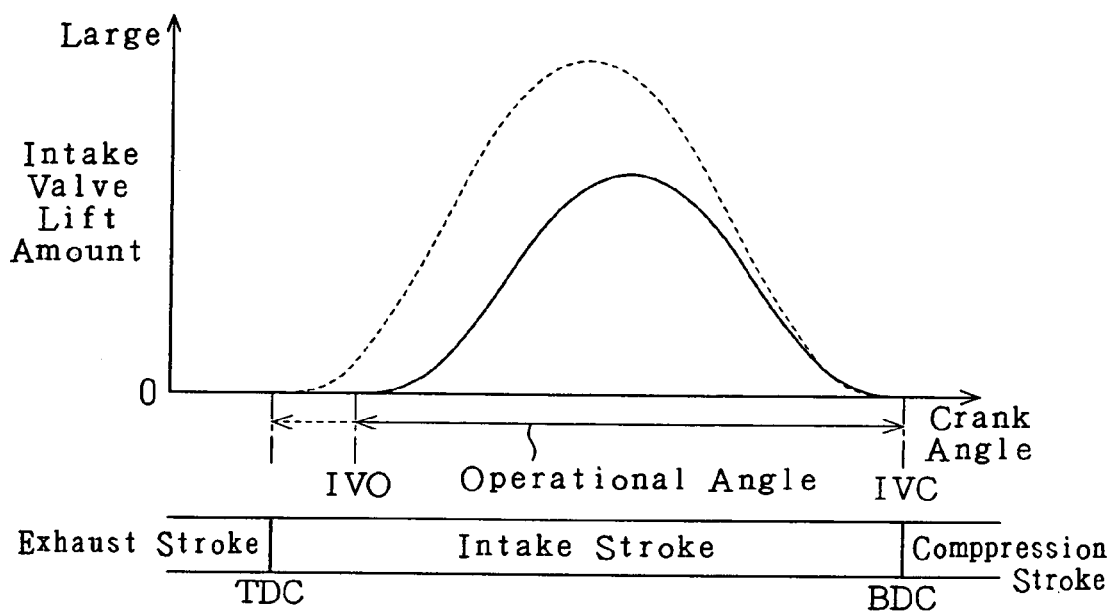
FIG. 7 is a performance diagram showing the relationship between crank angles and the valve performance of an intake valve when the valve performance control target is corrected to decrease the compression end temperature.
Figure 8:
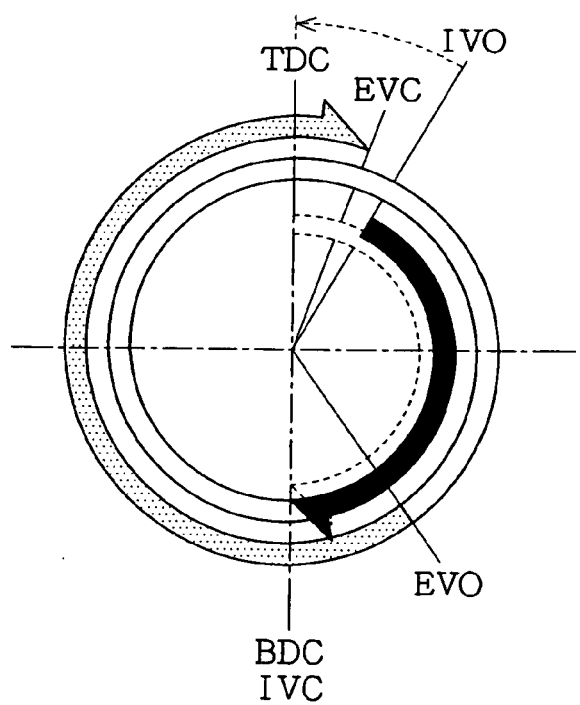
FIG. 8 is a diagram showing the valve open period of the intake valve in FIG. 7.

If the valve opening timing IVO of the intake valve 27 is close to the exhaust top dead center TDC as shown by the broken lines in FIGS. 7 and 8, the compression end temperature would be lower than when the valve opening timing IVO is later than the exhaust top dead center TDC (as shown in the state indicated by the solid line in FIG. 7 and the thick line in FIG. 8). This is considered to be due to, for example, the following reasons. As the valve opening timing IVO becomes later than the exhaust top dead center TDC, the period of time in which the piston 13 moves downward when the intake valve 27 is closed during the intake stroke becomes longer. This significantly depressurizes the cylinder. If the intake valve 27 is open in this state, air in the intake passage 22 will be rapidly drawn into the cylinder through the narrow space between the intake port and the head of the intake valve 27. This will generate frictional heat and increase the temperature in the cylinder. If the compression stroke is performed in this state, the temperature in the cylinder would further increase and thereby raise the compression end temperature.

If the valve opening timing IVO becomes closer to the exhaust top dead center TDC, the period of time in which the piston 13 moves downward in a state in which the intake valve 27 is closed becomes shorter. This reduces the amount of generated frictional heat. Thus, the compression end temperature becomes lower than when the intake valve 27 is opened later than the exhaust top dead center TDC as described above. Additionally, the valve overlap O/L is also changed when the valve closing timing IVC and the valve opening timing IVO are varied.

In this manner, the compression end temperature and the compression end pressure may be decreased to prevent knocking without retarding the final ignition timing by the required retardation amount by varying the valve performance factors of the intake valve 27, namely, the valve opening timing IVO, the valve closing timing IVC, and the valve overlap O/L. Accordingly, the relationship between the change in the valve performances and the change in the compression end temperature and the relationship between the retardation amount of the ignition timing and the change in compression end temperature are obtained beforehand through experiments or the like. Based on these relationships, the varied amount of the valve performance that is required to decrease the compression end temperature by the same amount as would be decreased using the required retardation amount obtained in step 120 is calculated.

Subsequently, in step 150 of FIG. 4, engine performance degradation $\Delta B$ caused by varying the valve performance by the amount calculated in step 140 is obtained. For the prediction, for example, the engine performance B1 when the valve performance is not changed is obtained. Further, the engine performance B2 when the valve performance (e.g., the valve opening timing IVO and the valve closing timing IVC) of the intake valve 27 is varied by the amount calculated in step 140 by adjusting the valve timing and the operational angle is obtained. The difference between the engine performances B1 and B2 (B1−B2) is then obtained as the engine performance degradation $\Delta B$. Alternatively, the relationship between the varied amount of the valve performance and the engine performance degradation may be obtained in advance for various operation states through experiments or the like. Then, based on the relationship, the engine performance degradation corresponding to the present engine operation state and the required retardation amount is obtained as the engine performance degradation $\Delta B$.

In step 160, it is determined whether or not the engine performance degradation $\Delta A$ obtained in step 130 is greater than the engine performance degradation $\Delta B$ obtained in step 150. If the determination is affirmative ($\Delta A > \Delta B$), the electronic control unit 61 proceeds to step 170. If the determination is negative ($\Delta A \leq \Delta B$), the electronic control unit 61 proceeds to step 180.

In step 170, the target valve timing and the target operational angle are corrected to change the valve performance by the varied amount obtained in step 140. The variable valve timing mechanism 41 is then controlled so that the actual valve timing of the intake valve 27 is adjusted to the corrected target valve timing. Further, the actuator 43 is activated so that the actual operational angle of the intake valve 27 is adjusted to the corrected target operational angle. The valve performance is varied by such control to decrease the compression end temperature and the compression end pressure. This reduces the tendency for knocking to occur. As a result, the ignition timing retardation amount required for preventing knocking becomes small (may be zero). Additionally, the engine performance degradation caused by varying the valve performance is smaller than when preventing knocking just by retarding the ignition timing.

In step 180, the required retardation amount obtained in step 120 is reflected in the calculation of the final ignition timing. The igniter 35 is controlled based on the final ignition timing reflecting the required retardation amount. The ignition timing retarded by such control prevents knocking. The engine performance degradation caused by the retardation of the ignition timing is smaller than when preventing knocking just by varying the valve performance.

The knocking prevention control routine ends after the processing of step 170 or step 180.

In the knocking suppressing control routine, when the operation state of the engine 11 is in the knocking occurrence range (YES in step 110), the required retardation amount of the ignition timing is calculated (step 120). Then, the engine performance degradation $\Delta A$ that would be caused when the ignition timing is retarded by the required retardation amount is predicted (step 130). Further, the varied amount of the valve performance corresponding to the required retardation amount is calculated (step 140). The engine performance degradation $\Delta B$, which would be caused when the valve performance is changed by the varied amount by correcting the control targets of the variable valve timing mechanism 41 and the variable operational angle mechanism 42 (the target valve timing and the target operational angle), is predicted (step 150). Then, the engine performance degradations $\Delta A$ and $\Delta B$ are compared with each other (step 160). The variable valve timing mechanism 41 and the variable operational angle mechanism 42 are controlled based on the corrected control target to vary the valve performances only if the engine performance degradation $\Delta A$ caused by retardation of the ignition timing is predicted to be greater than the engine performance degradation $\Delta B$ caused by varying the valve performances (step 170).

To vary the valve performance, if the valve closing timing IVC of the intake valve 27 prior to the varying is close to the intake bottom dead center BDC (see FIGS. 5 and 6), the control targets are corrected to retard the valve closing timing IVC. If the valve opening timing IVO of the intake valve 27 prior to the varying is retarded relative to the exhaust top dead center TDC (see FIGS. 7 and 8), the control targets are corrected so that the valve opening timing IVO becomes closer to the exhaust top dead center TDC. In the former case, the amount of air compressed during the compression stroke is reduced. This decreases the compression end temperature and the compression end pressure in the combustion chamber 17. In the latter case, as the valve opening timing IVO becomes closer to the exhaust top dead center TDC, the period of time in which the piston 13 moves downward when the intake valve 27 is closed is shortened. This reduces the amount of generated frictional heat. Thus, the compression end temperature and the compression end pressure become lower than when the intake valve 27 is opened later than the exhaust top dead center TDC. In both cases, the valve performances are variably controlled based on the corrected control targets so that the compression end temperature and the compression end pressure become lower than before the correction of the control targets.

Accordingly, the ignition timing retardation amount required for preventing knocking is decreased or the ignition timing does not need to be retarded at all. This eliminates problems that would be caused by retarding the ignition timing more than the originally required value (the value required for generating the maximum output). In other words, the engine output is prevented from being decreased. Further, the increase of the fuel injection amount, which is required for preventing excessive temperature increase in the exhaust gas purifying catalyst 20A, is reduced. This prevents the fuel efficiency from being lowered.

The required retardation amount of the ignition timing is calculated in step 120 of the knocking prevention control routine. This processing corresponds to the calculation of the ignition timing retardation amount in the retardation control performed when the valve performance of the intake valve 27 is adjusted to the control target that is in accordance with the current engine operation state. In step 160, it is determined whether or not the engine performance degradation ΔA is greater than the degradation ΔB. This processing corresponds to the determination of whether the ignition timing retardation amount is greater than a predetermined value. Further, in step 170, the control target (target valve timing and target operational angle) is corrected to change the valve performance. This processing corresponds to the correction of the control target of the valve performance so that the compression end temperature in the combustion chamber 17 becomes lower when the ignition timing retardation amount is greater than the predetermined value.

The preferred embodiment of the present invention has the advantages described below.

(1) When the ignition timing is retarded by the retardation control for preventing knocking and the retardation amount is large, the valve performance control target (the target valve timing and the target operational angle) is controlled to decrease the compression end temperature and the compression end pressure in the combustion chamber 17. This correction decreases the compression end temperature and the compression end pressure. Thus, the ignition timing retardation amount required for preventing knocking becomes small (may be zero). As a result, the increase in the fuel injection amount required for preventing excessive temperature increase in the exhaust gas purifying catalyst 20A, which would be caused by the retardation of ignition timing, is minimized. This prevents the fuel efficiency from decreasing. Further, a decrease in the engine output, which would be caused by greatly retarding the ignition timing, is prevented. In this manner, knocking is preventing without lowering the engine performance, such as decreasing fuel efficiency or decreasing engine output. Therefore, knocking is prevented further efficiently.

(2) When the valve closing timing IVC of the intake valve 27 is close to the intake bottom dead center BDC before correction of the valve performance control target, the control target is corrected to retard the valve closing timing IVC. The correction reduces the amount of air compressed during the compression stroke and thus decreases the compression end temperature and the compression end pressure.

(3) When the valve opening timing IVO of the intake valve 27 is retarded relative to the exhaust top dead center TDC before correction of the valve performance control target, the control target is corrected so that the valve opening timing IVO becomes closer to the exhaust top dead center. The correction shortens the period of time in which the piston 13 moves downward when the intake valve 27 is closed as the valve opening timing IVO becomes closer to the exhaust top dead center. This reduces the amount of generated frictional heat. Consequently, the compression end temperature is decreased.

(4) Prior to correction of the valve performance control target, the engine performance degradation ΔA that would be caused when the ignition timing is retarded by the retardation control without correcting the valve performance control target is predicted. Further, the engine performance degradation ΔB that would be caused when the valve performance control target is corrected is predicted. The degradations ΔA and ΔB are used to determine correction amounts for the control targets of the valve performances. Accordingly, knocking is suppressed without significant degradation of the engine performance by controlling the valve performances so as to minimize the engine performance degradation.

(5) In relation with advantage (4), the ignition timing is retarded if the engine performance degradation ΔA that would be caused by retardation of the ignition timing is smaller than the engine performance degradation ΔB that would be caused by correction of the valve performance control targets. Knocking is prevented more efficiently without lowering the engine performance by retarding the ignition timing in this manner than by correcting the valve performance control target.

When the engine performance degradation ΔA, which would be caused by retardation of the ignition timing, is greater than the engine performance degradation ΔB, which would be caused by correction of the valve performance control target, the valve performance control target is corrected. Such correction of the control target prevents knocking more efficiently without lowering the engine performance than when retarding the ignition timing.

It should be apparent to those skilled in the art that the present invention may be embodied in many other specific forms without departing from the spirit or scope of the invention. Particularly, it should be understood that the present invention may be embodied in the following forms.

The valve performance control target of the intake valve 27 may be corrected so as to decrease the compression end temperature and the compression end pressure under the condition that the ignition timing retardation amount is greater than a predetermined value when the control target is in accordance with the current engine operation state.

The valve performance of the intake valve 27 includes the maximum lift amount and the operational angle of the intake valve. However, the valve performance controller may be designed to change only the operational angle.

The present invention may be applied to an internal combustion engine that varies the operational angle of the exhaust valve 28 in addition to the operational angle of intake valve 27.

A variable operational angle mechanism differing from that of the preferred embodiment may be used. For example, the intake cam of the intake camshaft may be formed by a three-dimensional cam having a profile that changes in the axial direction to vary the operational angle in accordance with the engine operation state by shifting the intake camshaft in the axial direction by the actuator. It is only necessary that the operational angle of the intake valve 27 be variably controlled in accordance with the engine operation state.

The present examples and embodiments are to be considered as illustrative and not restrictive, and the invention is not to be limited to the details given herein, but may be modified within the scope and equivalence of the appended claims.

What is claimed is:

1. An engine valve performance controller for use in controlling valve performance of an intake valve in an engine that performs ignition timing retardation control to prevent knocking in at least one combustion chamber, the engine valve performance controller comprising:
    an ECU having program logic, which when executed and an ignition timing retardation amount, required by the retardation control to achieve a valve performance control target for the intake valve that is in accordance with a present operation state of the engine, is greater than a predetermined value, the program logic corrects the control target to decrease compression end temperature in the combustion chamber, in which the ECU thereby variably controls valve performance of the intake valve in accordance with the operation state of the engine.

2. The engine valve performance controller according to claim 1, wherein when valve closing timing of the intake valve is close to an intake bottom dead center before the control target is corrected, the control target is corrected to retard the valve closing timing.

3. The engine valve performance controller according to claim 2, wherein when valve opening timing of the intake valve is retarded relative to the exhaust top dead center before the control target is corrected, the control target is corrected so that the valve opening timing of the intake valve approaches an exhaust top dead center.

4. The engine valve performance controller according to claim 2, wherein the program logic when executed by the ECU predicts engine performance degradation that would be caused by retarding the ignition timing during the retardation control in a state in which the valve performance control target is uncorrected, predicts engine performance degradation that would be caused by correcting the valve performance control target, and determines a correction amount for the valve performance control target based on the predictions.

5. The engine valve performance controller according to claim 1, wherein when valve opening timing of the intake valve is retarded relative to the exhaust top dead center before the control target is corrected, the control target is corrected so that the valve opening timing of the intake valve approaches an exhaust top dead center.

6. The engine valve performance controller according to claim 5, wherein the program logic when executed by the ECU predicts engine performance degradation that would be caused by retarding the ignition timing during the retardation control in a state in which the valve performance control target is uncorrected, predicts engine performance degradation that would be caused by correcting the valve performance control target, and determines a correction amount for the valve performance control target based on the predictions.

7. The engine valve performance controller according to claim 1, wherein the program logic when executed by the ECU predicts engine performance degradation that would be caused by retarding the ignition timing during the retardation control in a state in which the valve performance control target is uncorrected, predicts engine performance degradation that would be caused by correcting the valve performance control target, and determines a correction amount for the valve performance control target based on the predictions.

8. The engine valve performance controller according to claim 7, wherein the valve performance control target is corrected only when the engine performance degradation that would be caused by the retarding of the ignition timing is predicted to be greater than the engine performance degradation that would be caused by correcting the valve performance control target.

9. An engine valve performance controller for use in controlling valve performance in an engine that performs ignition timing retardation control to prevent knocking, the engine valve performance controller variably controlling valve performance comprising:
    an ECU having program logic, which when executed, performs steps including:
    determining whether or not an operation state of the engine is in a knocking occurrence range;
    determining an ignition timing retardation amount that is required to prevent knocking;
    predicting a first engine performance degradation that would be caused by retarding a present final ignition timing in accordance with the required retardation amount;
    determining a varied amount of the valve performance that corresponds to the required retardation amount;
    predicting a second engine performance degradation that would be caused by varying the valve performance in accordance with the determined varied amount of the valve performance;
    determining whether or not the first engine performance degradation is greater than the second engine performance degradation; and
    carrying out either one of the following processes in accordance with the determination:
        i) varying the valve performance in accordance with the determined varied amount; and
        ii) retarding the ignition timing based on the determined required retardation amount.

10. A method for controlling an engine valve performance controller for use in an engine that performs ignition timing retardation control to prevent knocking, the valve performance controller variably controlling valve performance of an intake valve in accordance with an operation state of the engine, the method comprising:
    determining whether or not the operation state of the engine is in a knocking occurrence range;
    determining an ignition timing retardation amount that is required to prevent knocking;
    predicting a first engine performance degradation that would be caused by retarding a present final ignition timing in accordance with the required retardation amount;
    determining a varied amount of the valve performance that corresponds to the required retardation amount;
    predicting a second engine performance degradation that would be caused by varying the valve performance in accordance with the determined varied amount of the valve performance;
    determining whether or not the first engine performance degradation is greater than the second engine performance degradation; and
    performing either one of the following processes in accordance with the determination:
        i) varying the valve performance in accordance with the determined varied amount; and
        ii) retarding the ignition timing based on the determined required retardation amount.

* * * * *